United States Patent
Kent

(10) Patent No.: US 11,415,532 B2
(45) Date of Patent: Aug. 16, 2022

(54) RADIATION DETECTOR

(71) Applicant: BAE SYSTEMS plc, London (GB)

(72) Inventor: Lionel William John Kent, Chelmsford (GB)

(73) Assignee: BAE SYSTEMS plc, London (GB)

(*) Notice: Subject to any disclaimer, the term of this patent is extended or adjusted under 35 U.S.C. 154(b) by 141 days.

(21) Appl. No.: 16/969,818

(22) PCT Filed: Feb. 6, 2019

(86) PCT No.: PCT/GB2019/050312
§ 371 (c)(1),
(2) Date: Aug. 13, 2020

(87) PCT Pub. No.: WO2019/158902
PCT Pub. Date: Aug. 22, 2019

(65) Prior Publication Data
US 2020/0371048 A1    Nov. 26, 2020

(30) Foreign Application Priority Data

Feb. 15, 2018  (EP) ..................... 18157006
Feb. 15, 2018  (GB) ..................... 1802483

(51) Int. Cl.
*G01N 23/203*  (2006.01)
*G01T 1/20*   (2006.01)
*G01V 5/00*   (2006.01)

(52) U.S. Cl.
CPC ......... *G01N 23/203* (2013.01); *G01T 1/2018* (2013.01); *G01V 5/0025* (2013.01)

(58) Field of Classification Search
CPC ............... G01N 23/203; G01T 1/2018; G01V 5/0025
See application file for complete search history.

(56) References Cited

U.S. PATENT DOCUMENTS 3,790,785 A * 2/1974 Paolini .................. A61B 6/145
                                                       250/363.01
4,450,354 A   5/1984 Smith, Jr. et al.
(Continued)

FOREIGN PATENT DOCUMENTS

EP    0416970 A2    3/1991
GB    1560408 A     2/1980
(Continued)

OTHER PUBLICATIONS

International Search Report and Written Opinion received for PCT Application No. PCT/GB2019/050312. dated May 7, 2019. 12 pages.
GB Search Report under Section 17(5) received for GB Application No. 1802483.6, dated Aug. 14, 2018. 3 pages.
(Continued)

*Primary Examiner* — David P Porta
*Assistant Examiner* — Mamadou Faye
(74) *Attorney, Agent, or Firm* — Finch & Maloney PLLC

(57) ABSTRACT

A radiation backscatter detector assembly comprising:
a source array comprising source components for irradiating a shared sample location, at least two source components of the array generating radiation in different respective source energy bands;
a detector array comprising detector elements for detecting backscattered radiation detection events from different respective spatial portions of the shared sample location, the detector elements each generating a pulse output in response to each radiation detection event it detects; and
an energy meter for measuring the energies of the pulse outputs by different respective detector elements.

20 Claims, 6 Drawing Sheets

(56) References Cited

U.S. PATENT DOCUMENTS

| | | | |
|---|---|---|---|
| 4,580,048 A | | 4/1986 | Dion |
| 5,068,883 A | * | 11/1991 | DeHaan ............... G01N 23/203 |
| | | | 378/197 |
| 5,077,478 A | | 12/1991 | Walford |
| 2005/0263680 A1 | | 12/2005 | Stein et al. |
| 2010/0168947 A1 | | 7/2010 | Winso et al. |
| 2012/0201356 A1 | * | 8/2012 | Rothschild ........... G01V 5/0025 |
| | | | 378/87 |
| 2016/0146948 A1 | | 5/2016 | Hovgaard |
| 2017/0336526 A1 | * | 11/2017 | Arodzero ............. G01V 5/0066 |
| 2019/0010611 A1 | * | 1/2019 | Wilds ..................... C23C 24/04 |

FOREIGN PATENT DOCUMENTS

| | | |
|---|---|---|
| GB | 2083618 A | 3/1982 |
| GB | 2463707 A | 3/2010 |
| WO | 8906357 | 7/1989 |
| WO | 9427138 A1 | 11/1994 |
| WO | 2012130335 A1 | 10/2012 |
| WO | 2012142453 A2 | 10/2012 |
| WO | 2019158902 A1 | 8/2019 |
| WO | 2020104800 A1 | 5/2020 |

OTHER PUBLICATIONS

Extended European Search Report received for EP Application No. 18157006.0, dated Jul. 19, 2018. 9 pages.
International Preliminary Report on Patentability received for PCT Application No. PCT/GB2019/050312. dated Aug. 27, 2020. 8 pages.
International Preliminary Report on Patentability received for PCT Application No. PCT/GB2019/053288. dated Jun. 3, 2021. 7 pages.
International Search Report and Written Opinion received for PCT Application No. PCT/GB2019/053288. dated Feb. 17, 2020. 8 pages.
Search Report under Section 17(5) received for GB Application No. 1819119.7 dated May 31, 2019. 5 pages.
Search Report under Section 17(5) received for GB Application No. 1819183.3 dated May 31, 2019. 5 pages.
Extended European Search Report received for EP Application No. 19154080.6 dated Aug. 5, 2019. 7 pages.

* cited by examiner

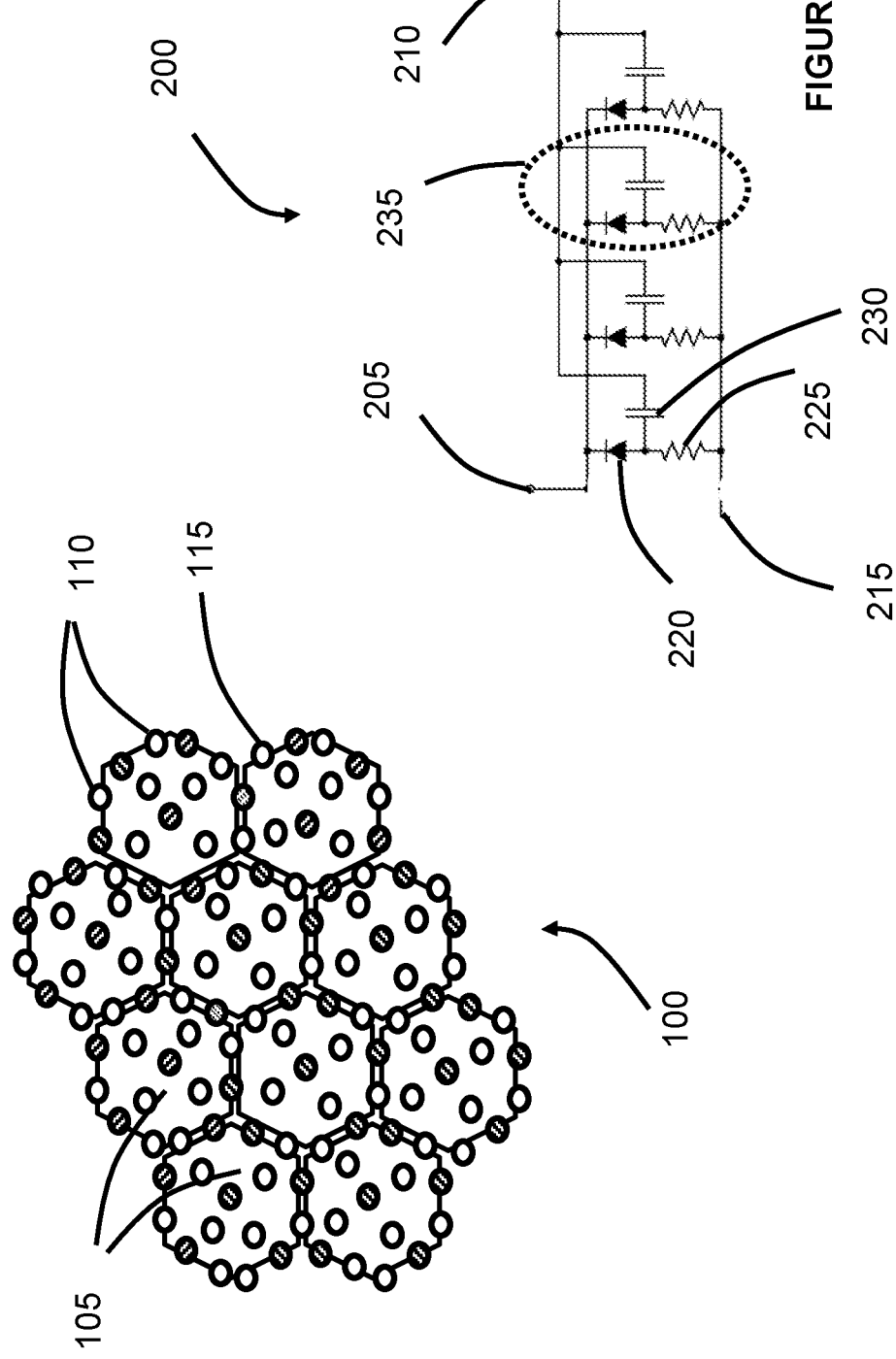

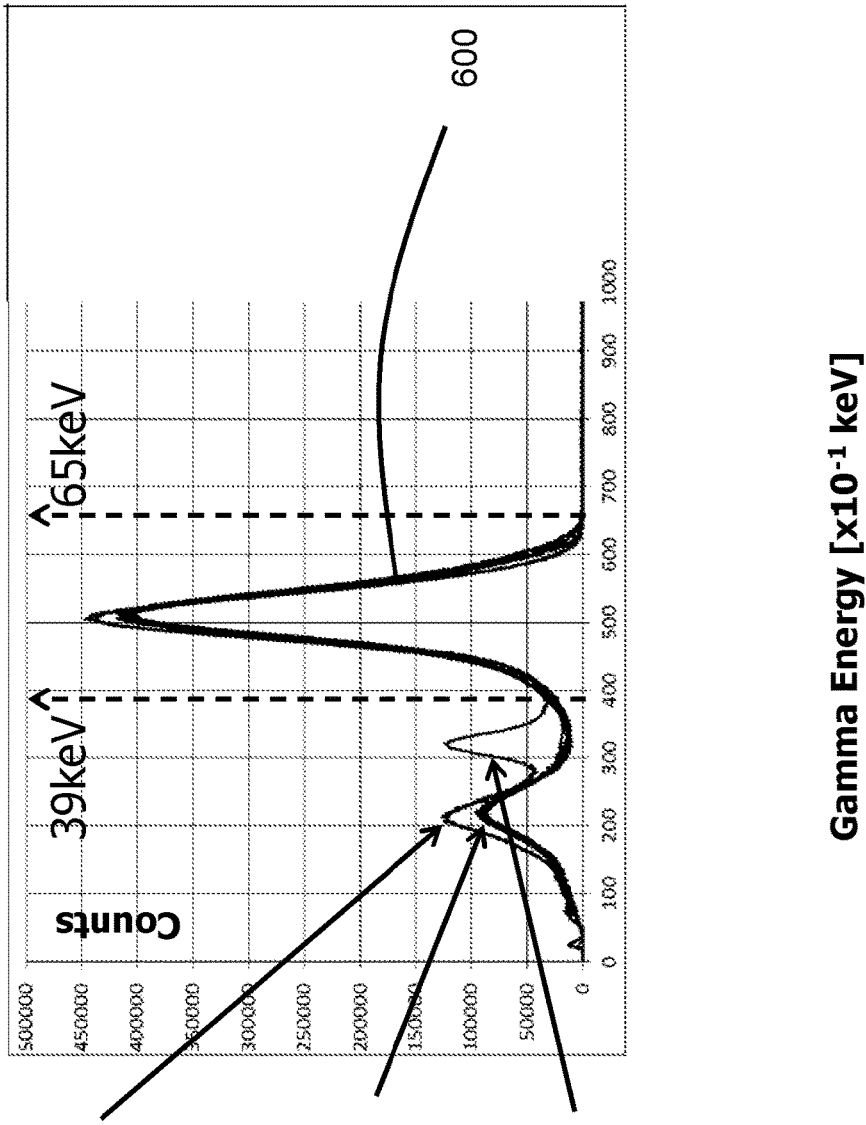

Figure 6: Gamma Backscatter Spectral Response from Various Targets

- Simulant samples still yield a consistently & identical higher secondary peak at ~21.2keV.
- All non simulant test samples still have consistently lower secondary peak at ~22keV.
- Activation peak at ~32keV is probably due to Au plating of PCB sample.

All traces have been re-normalised to yield the same total number of counts over the energy span 39 keV to 65keV.

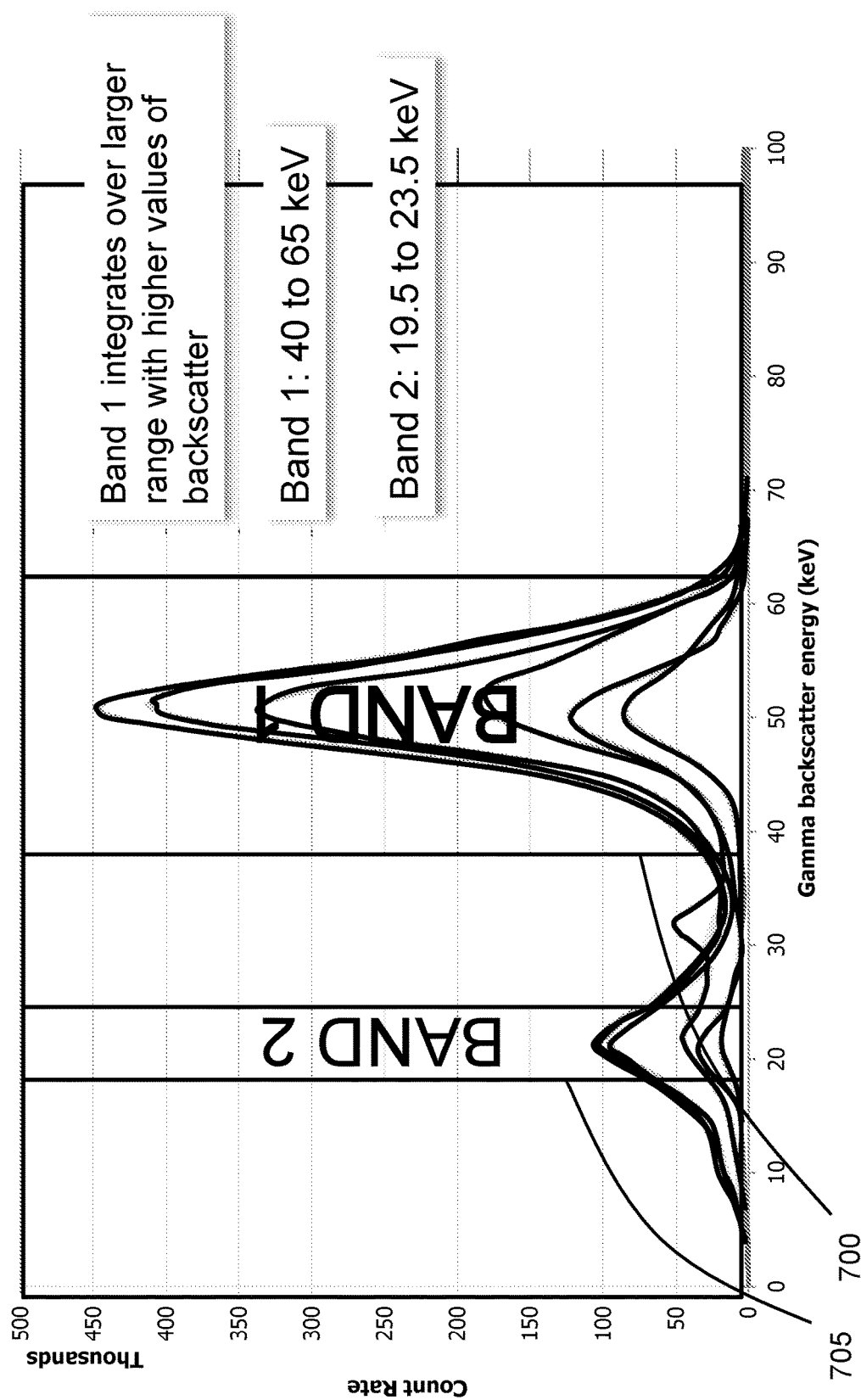
Figure 7: Dual Gamma Energy Detection, Bands 1 and 2

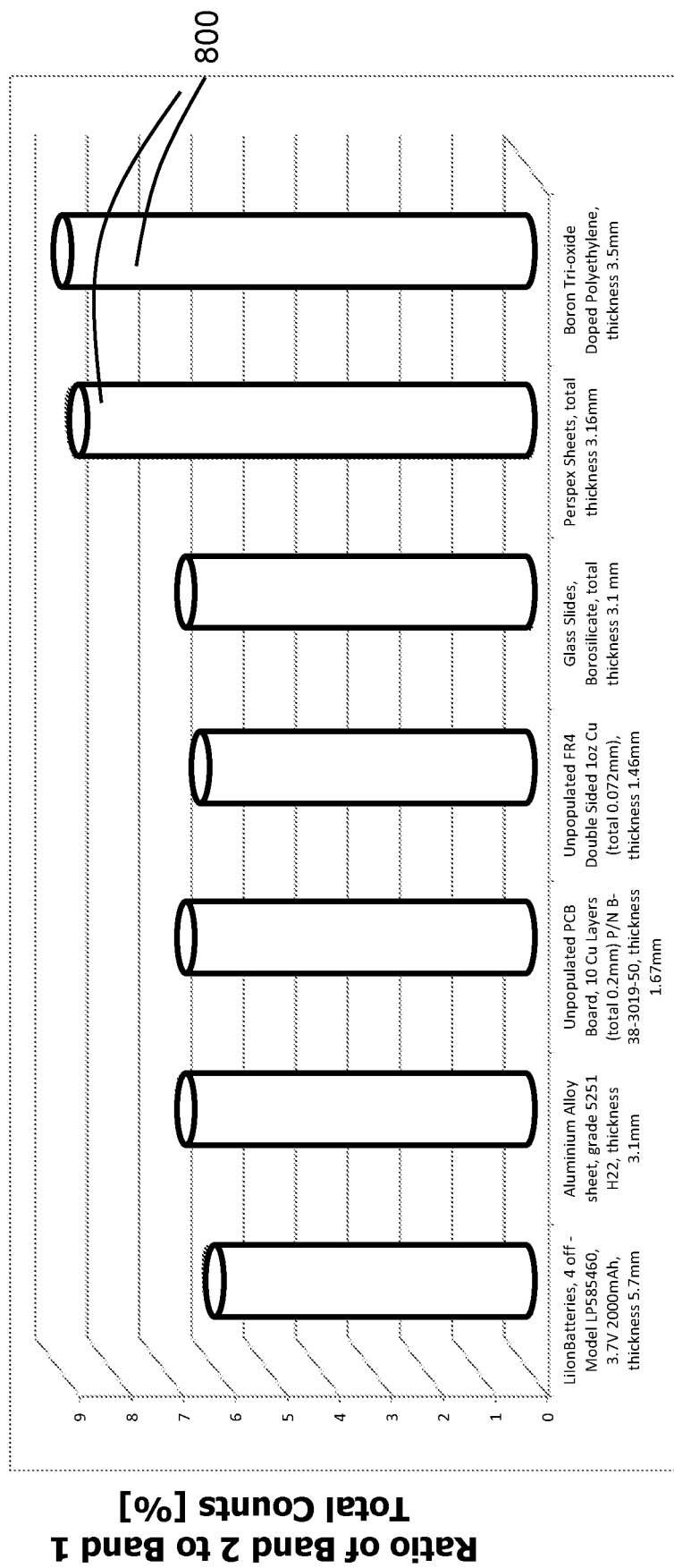
Figure 8: Ratio of Band 2 to Band 1 Total Counts for Different Materials.
The Ratio of total Counts in BAND 1 (40keV to 65keV) to that in BAND 2 (19.5keV to 22.5keV) is significantly higher for the explosive simulant materials (two righthand pillars) when normalised to equalise total counts of the main Backscatter gamma peak between 40 and 65keV.

RADIATION DETECTOR

The present invention relates to a radiation detector, for example a Compton radiation backscatter detector. It finds particular application in detecting concealed materials.

The proliferation of portable electrical devices represents an improved opportunity for terrorists to smuggle explosive devices. It is known to use X-rays in detecting materials such as explosive devices hidden in hand luggage. However, the known colour coded images can be very complex to read in a short time. A security operator may for example have a time window of about 5 seconds to scan for threats. Further, there is a need for a more portable arrangement which can be deployed on an ad hoc basis, for example to supplement security arrangements on boarding or landing an aircraft.

According to a first aspect of the present invention, there is provided a radiation backscatter detector comprising:

a source array comprising source components for irradiating a shared sample location, at least two source components of the array generating radiation in different respective source energy bands;

a detector array comprising detector elements for detecting backscattered radiation detection events from different respective spatial portions of the shared sample location, the detector elements each generating a pulse output in response to each radiation detection event it detects; and an energy meter for measuring the energies of the pulse outputs by different respective detector elements.

The different respective spatial portions of the shared sample location may, in practice, overlap as any one backscatter radiation event may trigger a response in more than one detector element. However, it is important that the outputs from different respective detector elements can be distinguished.

The radiation backscatter detector may further comprise an event collator for sorting pulse outputs according to their measured energy, the outputs being generated by at least two different detector elements. Preferably, the pulse outputs are also sorted according to the respective detector elements generating them. This supports at least a basic mapping process for material distribution over the shared sample location.

The radiation backscatter detector may further comprise a counter for counting sorted pulse outputs having a measured energy in each of at least two different detector energy bands. These pulse output counts can then be processed, using a processor, to give a pulse count ratio between the detector energy bands for each detector element. It has been found that material types or groups can be distinguished by this pulse count ratio. Thus embodiments of the invention can potentially detect and map the distribution of a material group across the shared sample location by mapping the count ratio from different detector elements.

It might be noted that it may not be possible to identify individual materials by these energy bands in that for example a lithium ion battery, borosilicate glass and aluminium all might produce the same or similar measured ratio. However, the energy bands for one material type or group has been found to be characteristically different from that of another type or group. Material groups potentially of interest in this respect are explosives and narcotics.

The detector array may be considered as a tiled distribution of detector elements. Each tile might represent a detector element, the tile producing a pulse output in response to each radiation detection event it detects. The tiles might each comprise a single device or a group of devices generating between them a common output. The shape of the tiles is preferably a shape that means they can be packed together closely and contiguously, producing a "tessellated" array of tiles. This means that the shared sample location can be examined for radiation backscatter without significant gaps. For example, the tiles might be of a regular shape such as square, rectangular or hexagonal.

In order to measure a characteristic response in different energy bands, even at extremely low backscatter levels, it is possible to use a scintillator together with a photo-multiplying detector. In order to achieve the scale necessary to map material distribution across the kind of devices that might have been used for concealment in the modern day, embodiments of the invention may comprise a silicon photomultiplier. Known silicon photomultipliers are based on an array of avalanche photodiodes (APDs), each of which has its own output, for example by means of its own quenching resistor. An advantage of a detector array comprising APDs is the small scale of individual APDs together with the ability to respond to extremely low levels of photon flux, even to individual photons. A known form is the single photon avalanche photodiode (SPAD), for example as used in medical imaging.

It is known to provide a tiled array of APDs, in particular SPADs. Each tile in a particular known arrangement comprises a set of microcells. Each microcell is a SPAD with its own quenching resistor. A microcell is fired in response to an absorbed photon from the scintillator. A current flows from that microcell onto an output line from its tile. Although each microcell fires independently, the sum of their currents flowing on the output line indicates the magnitude of the instantaneous photon flux across the tile.

The detector array can act as a channelised photon counter, each channel being dedicated to a detector element. The photon flux occurring during a pulse output indicates the energy of that pulse output and, in a known detector array, might be expressed as an electrical charge or output current.

Using SPADs in this context, it might be noted that each SPAD has to be reset after firing on detection of a photon. For the accurate detection of photon numbers, the photon flux needs to be sufficiently low that the number of coincident photon absorption events is small for each SPAD. If more than one photon is absorbed by a microcell during the period from firing to reset, then only one photon is recorded as having arrived.

In this context, the tile (detector element) produces a pulse output in terms of the rise and fall of the photon flux over time, and hence the integrated current (or an equivalent value) over the course of the pulse gives the energy of the pulse output and therefore indicates in which energy band, if any, it should be counted.

The source components may comprise at least two different radioisotopes, for example selected from isotopes of americium, barium and/or europium. These different source isotopes will generate radiation at different respective spectral emission lines, thus generating radiation in the different respective source energy bands. Further, they are commercially available "off the shelf" and have an appropriate half-life. However, other isotypes of other elements may be found suitable.

Preferably, the source components are distributed in relation to the detector elements, for instance spaced along a one dimensional array of detector elements or positioned as a network across a two-dimensional array of detector elements. The source components may be positioned to give a predictable irradiation pattern over the shared sample location, and preferably an even distribution in each source energy band. This may be expressed as an even intensity for the backscatter intensity reaching the detector elements, in terms of the Compton differential scattering cross section integrated over the solid angle encompassed by each detector tile.

Since the source components will not themselves detect backscattered radiation, they effectively create at least a partial break, or shadow, in relation to the detector array. The sources will normally be mounted on discs such as lead or tungsten discs to prevent radiation from them directly entering the detector array. It may therefore, particularly in a two dimensional detector array, be preferable to mount the source components along the boundaries of the detector elements.

It will of course be appreciated that features described in relation to one aspect or embodiment of the present invention may be incorporated into other aspects or embodiments of the present invention. For example, the method of the invention may incorporate any of the features described with reference to the apparatus of the invention and vice versa.

A backscatter radiation detector assembly according to an embodiment of the present invention will now be described by way of example only with reference to the accompanying schematic drawings of which:

FIG. 1 shows a plan view of part of a tiled array of microcell detectors, including gamma sources for sample irradiation;

FIG. 2 shows schematic circuitry for a set of four microcell detectors based on avalanche photodiodes;

FIG. 6 shows a backscatter spectral response from various target materials to gamma irradiation in different respective energy bands;

FIG. 7 shows un-normalised backscatter spectral plots as a function of energy overlaid with two separate energy bands within which the number of Compton Backscatter events are recorded; and FIG. 8 shows the count ratios for the two different energy bands identified in FIG. 6 for various sample materials.

Figure 5:
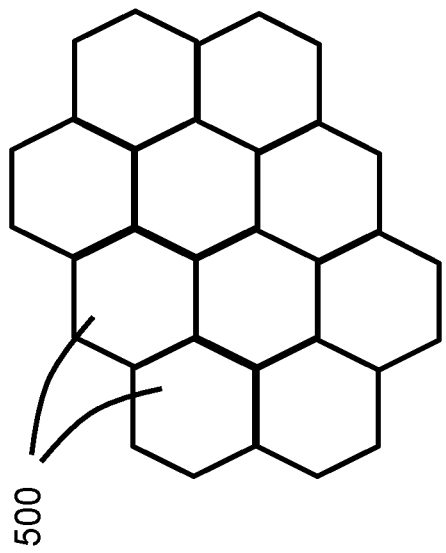
FIG. 5 shows a hexagonal array of scintillation material for use in the tiled array of FIG. 1.

Referring to FIGS. 1 and 2, the backscatter radiation detector is based on an array 100 of microcell detectors in a tiled formation, in particular silicon photomultiplier detectors. Each tile 105 is contiguous with a number of other tiles and is provided with a plurality of gamma sources 110, 115 and has embedded in it a plurality of microcell detectors 235.

The gamma sources are evenly distributed about each tile 105 and comprise seven Ba133 sources 110 (shown crosshatched) and ten Am241 sources 115 (shown clear). Six of the barium sources 110 are spaced about the edge of each tile and one is placed centrally. Six of the americium sources 115 are also placed about the edge of each tile and four spaced evenly at a radius intermediate the centre and the edge. Sources 110, 115 along the edges of the tiles 105 are shared between contiguous tiles. This configuration of sources reduces the rate at which gamma flux falls with distance r from the source plane. By comparison, the gamma flux of a single point source decreases at a rate of approximately $1/r^2$. Measurements with a lead shield and aluminium supporting structure, as described below in relation to FIG. 4, have shown that the backscatter signal level from a target layer fell only by a factor 2 with every approximately 15.5 mm increase in range.

Regarding the sources 110, 115, these are radioisotope sources which generate a number of discreet photon energies. For example Americium-241 (Am241) emits gamma at 59.54 keV and 26.34 keV as well as at a number of other discrete photon energies, although the branching ratio for emission of these other photon energies is negligible compared with the two lines quoted. The Ba133 sources provide higher gamma emission energies than the AM241 sources, for example 81 keV.

The gamma source array configuration, in the embodiment being described, might then consist of:
  ten sealed Am241 sources of activity 29.6 kBq (+/−20%)
  seven sealed Ba133 sources of activity 100 kBq (+20%/−10%), or sealed Eu152 sources of activity 100 kBq (+20%/−10%)

The Am241 sources are supplied by High Tech Sources Limited (part number AMMK7650) and the Ba133 is supplied by Ritverc GmbH (part number GBa3.11).

A further potential source for embodiments of the invention is Europium-152, in particular the 121.78 keV gamma emission line of Europium-152 (Eu152). Sealed Eu152 sources are also supplied by Ritverc GmbH (part number GEu2.11).

It has been noted that the 26.34 keV gamma line of Am241 has been found to be significantly attenuated by the materials found in a typical tablet or laptop and thus may not be ideal for embodiments of the invention, depending on the intended application. Preferred from this point of view might be the gamma ray emission lines emitted by Barium-133 (Ba133) or possibly Europium-152 (Eu152).

The radioactive half-lives of the three radio-isotopes Am241, Ba133 and Eu152 vary considerably with values of 432.6 years, 10.51 years and 13.517 years, respectively. A recommended working lifetime for the Ba133 and Eu152 sources is 15 years. The impact of the relative variation in the activity of the source over time due to the significantly low half-life of either Ba133 or Eu152 on the resulting gamma backscatter spectra intensity may need to be compensated for computationally.

Although other isotopes of other elements might be found useful, only Am241, Ba133 and Eu152 are currently proven to be useful for embodiments of the present invention. For example of the nineteen isotopes of Am, only three have significant lifetimes (all the rest have half-lives of less than a day), and only Am241 emits a useful gamma for the current application.

FIG. 2 shows four microcell detectors 235 as they would be connected on a tile 105. Each microcell detector 235 comprises a single photon avalanche photodiode (SPAD) 220 connected with a quench resistor 225 between a cathode 205 and an anode 215. All the microcell detectors are connected via a fast output capacitor 230 to a tile output 210.

Tiled arrays of microcell detectors of this type are supplied by SensL Technologies Ltd. A tiled array lends itself to supporting a suitable arrangement of source components which can be placed along or between the edges of the tiles.

Figure 4B:
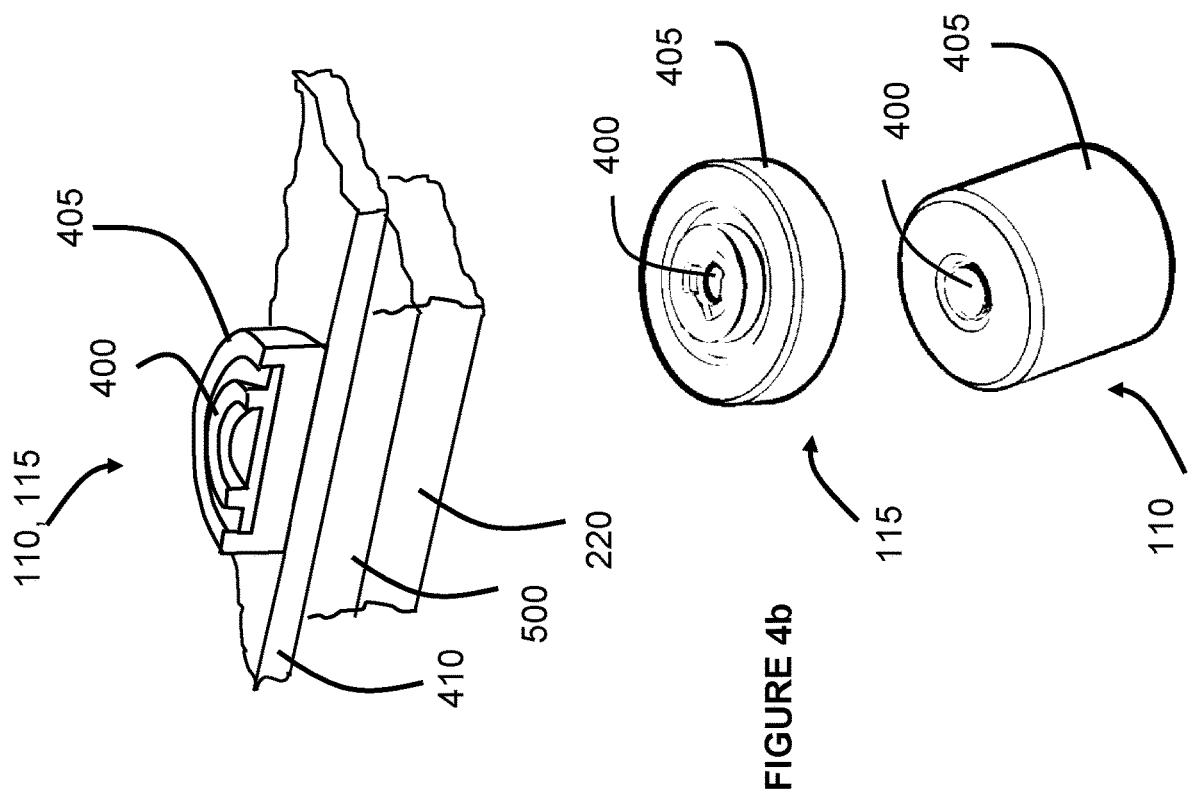
FIG. 4b shows a vertical cross section through a schematic geometry for a source component for use in the backscatter radiation detector assembly, together with two example source components.
Figure 4A:
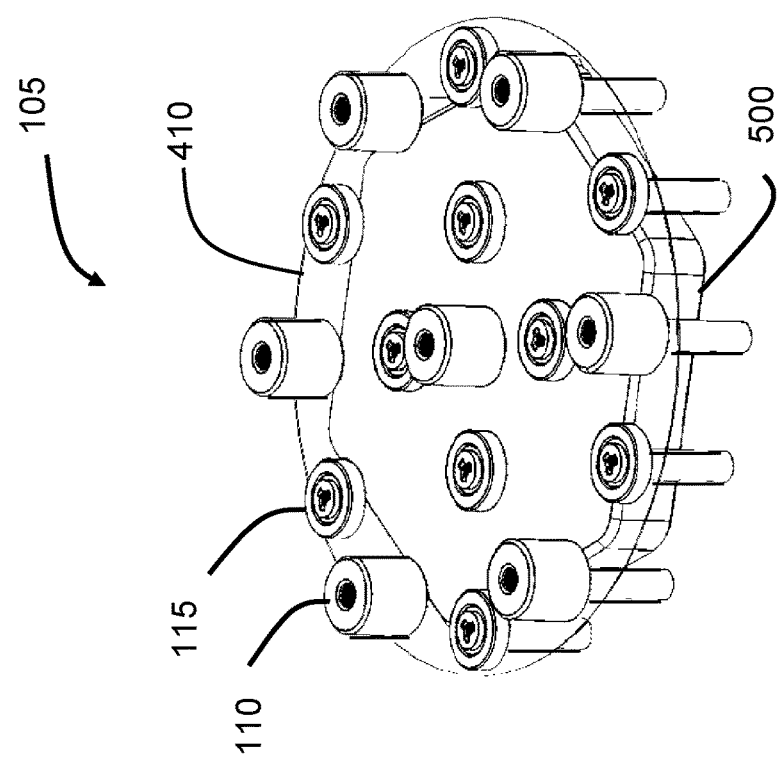
FIG. 4a shows a schematic one quarter view from above of a detector tile for use in the assembly of FIG. 3.

Referring to FIG. 4, each detector tile 105 consists of a tile 500 of scintillator crystal (could be a plastic although this is less efficient) which on its rear (large) surface is bonded an array(s) of SPADs 220. Except where the SPADs 220 are bonded with an optically transparent adhesive, the polished surfaces, including the edges, of the scintillator tiles are coated with a high reflectivity coating. This ensures that any optical photons generated within the scintillator by an absorbed gamma photon are guided to encounter an individual SPAD 220 and cause it to fire generating a charge pulse. (This ignores the impact of any optical losses at the reflective coatings.)

Regarding dimensions, options are either to use a set of detector tiles 100 so that no moving detector array is needed, the dimension of each tile being such as to provide a preferred resolution in terms of finding a threat material 320 in the sample 300, or alternatively to use a scintillator detector on a 2D scanning system. An issue then would be the time taken overall, based on the time to scan at each position before moving on to the next scan position.

An example of an americium radioisotope source component 115 (Am241) comprises americium material 400 mounted on a 2 mm thick disc shaped lead or tungsten shield 405 of diameter 8 mm to protect the detector array from direct irradiation. These discs 405 have been found extremely effective, for example suppressing transmission of the 59.43 keV (sometimes referred to as 60 keV) gamma line by about 99.993%. The sources 115 are then supported on the scintillator layer 305, optionally via an intervening support layer of aluminium 410.

Each of the Ba133 sources would be placed on a 7 mm thick tungsten disc shield 405 of diameter 8 mm to provide direct line of sight shielding between the sources and the scintillator. Suppression of the 80.9 keV emission line would be approximately 100%, while suppression of the 276 keV gamma emission line would be greater than 97.2%.

An alternative option for the Ba133 sources are sealed Eu152 sources which may provide tangible performance benefits. Eu152 would preferably be provided with thicker shielding than Ba133 sources but 7 mm tungsten is thought acceptable in practice. Another option would be to use gold shielding, although this option would be very expensive and so not practical from a commercial perspective.

Referring additionally to FIG. 5, the scintillator layer 305 is a tiled array of hexagonal scintillator crystals 500, each of thickness approximately 10 mm, the array covering a footprint equal to that of a typical laptop, approximately 400 mm×250 mm. Each scintillator crystal 500 would correspond to a tile 105 of the tiled array 100 for detecting the scintillation pulses. A suitable type of scintillator is described at https://www.crystals.saint-gobain.com/products/pixellated-arrays, these arrays being supplied by Saint-Gobain Crystals which is a business of Saint-Gobain Ceramics. Saint-Gobain provides for example 2D pixelated array assemblies for use in medical scanners, and linear arrays which are used for airport baggage scanners. Saint-Gobain has also published useful tables on the performance properties of various scintillator crystals. Typically, NaI(Tl) might be used which is a well-established, relatively 'cheap' material albeit slower than Lanthanum Chloride (BrilLanceCe™ 350). It has a relatively good yield of approximately 38 optical photons at a centre wavelength of approximately 415 nm for every keV of absorbed photoelectron energy. The downside of this material is that the decay time for the optical scintillation pulse is quite long at 250 ns (the 1/e value). This means the average detected count rate must be less $1/250$ ns, i.e. less than approximately 4 million counts per second. However this count rate limit does not take into account the impact of shot noise statistics which predict for a given count rate the probability of the number of optical pulse coincidence events where two gamma rays are detected within the approximately 250 ns decay time. Therefore in practice the rate at which counts due to a single gamma photon absorption event are reliably resolved using NaI(Tl) will be significantly less than 4 million counts per second.

Regarding the distribution of the sources 110, 115 over the face of the source/tiled array 100, this is now described in relation to FIGS. 1, 4 and 5.

Ideally, the sources 110, 115 would be spread uniformly across the surface and along the edges of the scintillator tiles 500. With regard to the distribution of sources 110, 115 around the edges of the tiles 105, or across the surface, this should be as symmetrical as possible for the number of sources of each type.

The diameter of the disc shields 405 needs to be sufficiently large that the direct line of sight of the from the gamma source to any point across the scintillator crystal 500 has a sufficient path length in the shielding material to stop any direct gamma transmission. For the 60 keV line of Am241 or the ~81 keV line of Ba133, a 2 mm transmission path through lead (which stops about ~99.99% of incident gamma at 60 keV) is more than sufficient. The source geometry, namely its radio-isotope height relative to the base of the source package that sits directly on the shield 405, combined with the energy of the gamma photons of interest, in general determine the minimum diameter for the shield required.

The maximum number of sources 110, 115 that can be accommodated is a judgement call. The more sources 110, 115 that are placed on a tile 105, either around its periphery or on its top surface, the larger the fractional area which will be 'blind' to Compton backscattered photons. As an example, using fifteen Am241 sources 115 in the geometry shown in FIG. 1, if the total top surface area of the tiled array 100 is nominally defined by a circle of area 4560 mm², the area of lead shields 405 each of 8 mm diameter was approximately 754 mm2. So to first order, ~16.5% of the array aperture was obscured, ignoring shadowing caused by the height of the lead discs 405 and also the impact of the angular intensity distribution of the Compton backscattered photons. The result was a geometry that worked well with the disc shields 405 not substantially increasing the integration time needed to get sufficient counts to suppress the impact of shot noise statistics (i.e. root n/n noise) on the final result. As an estimate, it might be reasonable to increase the number of sources 115 until the area of the scintillator or detector tile 500, 105 obscured by the associated gamma shield (discs 405) of each source occupies about half the tile's surface area.

With regard to the total activity of the different source types, this should be biased in favour of the higher energy sources as the Compton effect falls off with increasing gamma energy. Ideally one wants nominally equal numbers of backscattered photons from each of the gamma emission lines—this will give the best shot noise (root n over n) statistics in terms of stable count rates per individual measurement.

Finally in regard the distance to the target, this again is a trade-off. In the specific case of the prototype geometry with fifteen Am241 sources, it was found that the Compton backscatter signal fell off at the rate of about a factor two every ~15.5 mm of increased height. So the target should ideally be placed as close to the sources 110, 115 as possible to minimise the time taken to achieve good shot noise statistics on the count rate within given energy bands.

Regarding mounting of the sources 110, 115 on the detector array 100, their shielding discs (or cups) 405 can be bonded directly to the top surface of the scintillator material 500 for the sources which are not placed around the edges of the tiles 105. However it might be preferred to bond the sources 110, 115 to a thin aluminium sheet 410 of for example 0.2 mm thickness. This thin aluminium sheet 410 would be placed on the top surface of the scintillator tiles 500. This way the sources can be removed if necessary, without having to throw away for example the scintillator tile and associated SPAD arrays bonded to it. The scintillator tiles 500 are provided with a highly reflective coating. Mounting the sources 110, 115 via an Al sheet avoids potential ill effects of bonding directly to this reflective surface. One mounting option would be for holes to be drilled through the aluminium sheet 410, and mounting rods to pass through them to locate the aluminium sheet 410.

Figure 3:
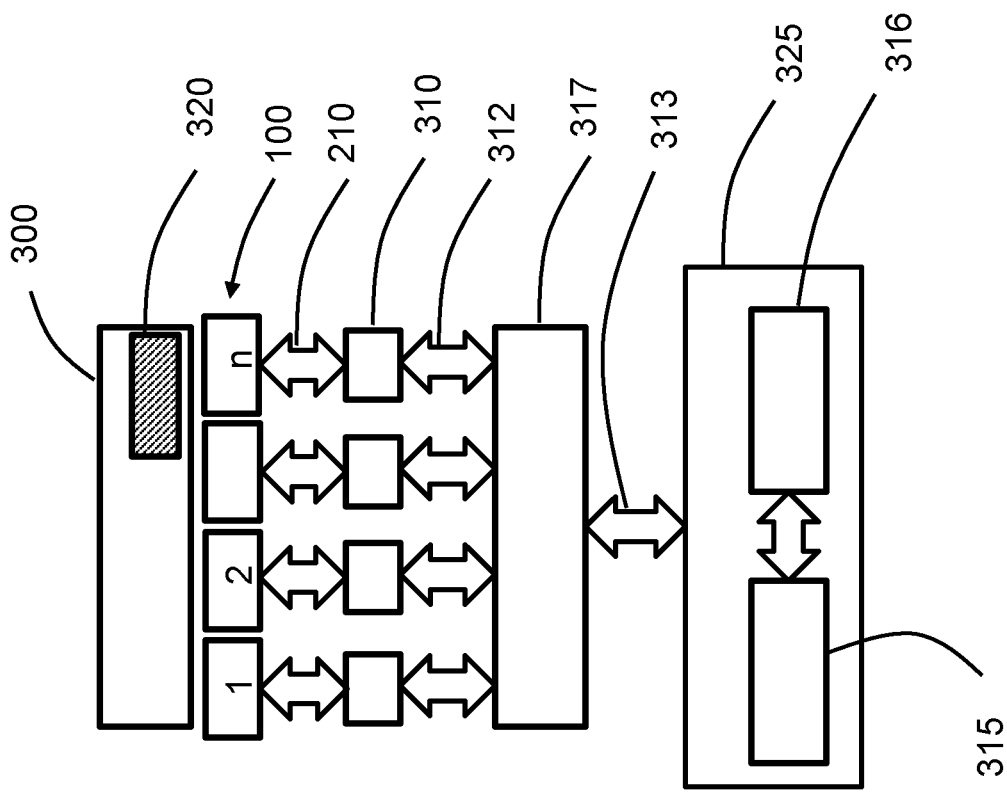
FIG. 3 shows a schematic block diagram of the backscatter radiation detector assembly.

Referring to FIGS. 1 and 3, a sample such as an electrical device 300 under test would be placed directly over the source/tiled array 100. Preferably this might be achieved by loading the device 300 in a frame that can then be moved remotely into position over the source array 100 in order to avoid user exposure to the sources 110, 115. Gamma radiation emitted by the sources 110, 115 will pass through the device 300 and a small percentage (approximately 2% at 60 keV from an approximately 5 mm thick explosive sample) of the incident radiation is backscattered, back towards the sources 110, 115 and the scintillator-based detector tile array 305, 100 beneath them. The backscattered gamma photons generate photoelectrons inside the scintillator crystal layer 305, which in turn generate pulses of light linearly proportional to the energy of the individual absorbed gamma. The SPADs of the tiled array 100 detect each light pulse and generate a highly amplified electrical current pulse of total charge proportional to the respectively detected light pulse energy. These charge pulses are channelized by a multi-channel processor 310. This channelized digitised data is then transferred to a data collection software package as the event collator 315. An example is eMORPHO, provided by Saint Gobain referred to above.

Signal crosstalk between tiles 105 will generally be low since optically they are completely isolated from one another. The scintillator crystal is coated with a high reflectivity surface, in the visible spectrum, so that photons hitting the sides of the scintillator will typically multiply reflect until eventually the photons impinge on one of the optical detectors of the SPAD array and are absorbed. Gamma photons are completely absorbed by a photo-absorption event in a given scintillator crystal or not at all. However, energy can be coupled from the gamma photon to a recoil electron in the scintillator material if a Compton scattering process occurs. For example, in the specific case of Compton scattering of a 60 keV gamma photon, the energy transferred to the recoil electron will vary between 0 keV and maximum of 11.24 keV (the retro-reflection case). The deflected lower energy gamma ray may then be either absorbed in a subsequent photo-absorption event, scattered in another Compton scattering process in which case less energy is transferred on average to the recoil electron, or finally exit the scintillator tile. Gamma photons that interacted with two different tiles through a combination of Compton scattering events, and then possibly a subsequent photo-absorption event, would yield gamma energies smaller than those absorbed solely in a single tile, so could be discriminated against.

Referring to FIG. 3, the tiled array 100 of FIG. 1 is arranged below a sample 300 to be scanned, such as a "device under test"; a laptop or the like, within which a threat material 320 is hidden. The sample/device 300 is placed over the array of detector tiles 105, 1 to n.

Each SPAD array(s) 100 on a given detector tile 105 is connected to a charge pulse bus 210 which transmits the charge pulses associated with each absorbed photon to a corresponding multi-channel analyser 310 (MCA). This MCA 310 could alternatively be a dual or more channel analyser. The MCA 310 collects all of the charge pulses associated with a gamma absorption event and channelizes the collected charge to yield a detected gamma energy value, which is digitised and then transmitted to a hub 317 via a digital data bus 312 that is associated with the particular MCA 310. The purpose of the hub 317 is to route all of the digital signals from the set of MCAs 310 to a system controller 325, which typically may be a laptop computer, via a further data bus 313. The further data bus 313 can be USB-based, Ethernet, or another appropriate digital bus technology. A USB hub 317 for example can support 127 USB inputs 312 to a single USB output 313.

Within the system controller 325 will be located an event correlator 315 responsible for data collection, data analysis and threat status determination. Also within the computer 325 there is a network controller 316 to control data flows through the network of digital links.

Referring additionally to FIGS. 1 and 2, in use, backscattered gamma photons generated originally by the gamma sources 110, 115 may produce a burst of scintillation photons in the scintillator layer 305 of the detector array 100. Each SPAD 220 that detects a scintillation photon or photons emitted within its respective tile 105 will generate a highly amplified charge pulse through the electron avalanche effect. This charge emerges as a pulse through the tile's signal line 210. Other SPADS 220 of the same tile 105 likewise dump charge pulses onto the same signal output line 210. Summing all of the charge of the charge pulses within a suitable gated time window yields a figure for the total energy dumped into the scintillator crystal by an individual absorbed gamma and then detected in a tile 105. Summing might for instance be done by measuring the voltage drop across a resistor through which the charge pulses pass. The output current from the tile therefore indicates the photon flux resulting from a backscattered gamma photon. The length of the gated time window required will be dependent on the relaxation time of the scintillator crystal material and must exceed it. For NaI(TI) this relaxation time is quite long at 250 ns.

The total summed charge pulse is then passed to a multichannel or dual channel analyser (MCA/DCA) 310 to effect a determination of the energy of the original absorbed gamma which would have released a large number of scintillation photons at approximately the same time. Thus the output from each individual tile 105 will be passed to its own MCA/DCA 310.

The energy of a backscattered gamma photon is determined by measuring the total optical pulse energy associated with every photoelectron event associated with the absorption of a gamma photon. The total optical pulse energy here is for its part determined by measuring the total charge released by the charge avalanche events within the SPADs 220 attached to the scintillator layer 305 of a given tile 105 of the array.

The use of a tiled array 100 means that if a suspect device 300 is placed over it and threat material 320 is very localised, then the selected tile(s) 105 over which the threat material 320 is placed will yield a greatly enhanced signal relative to other tiles 105, giving significantly more information than would be the case if all the signals from different detectors were simply added together. Further, the sources 110, 115 can be placed on the edges of each tile 105 and so will provide gamma radiation for either a pair of tiles (adjacent tiles) or three tiles (where three tiles 105 meet).

Referring to FIGS. 6 to 8, experimental results are given for the gamma backscatter spectral responses as a function of energy due to illumination of targets by the 60 keV and 26.34 keV gamma lines of Americium-241 (Am241). The gamma backscatter spectra energy spectra have been rescaled so that the total number of counts between 39 keV and 65 keV for any given material was identical. Inspection of the renormalized spectral traces shows that the explosive simulant materials Perspex and boron trioxide polyethylene very accurately track one another. These traces are also distinctly different from the set of 'benign' materials at energies below approximately 25 keV, where the 26.34 keV gamma emission line contributes to the backscatter spectrum. The backscatter spectral peak at approximately 21.2 keV for the simulant materials is roughly a factor of 1.34 higher than the set of peaks at approximately 22 keV for the set of various benign materials examined, which also track one another accurately.

FIG. 6 shows a backscatter spectral response 600 from various target materials to gamma irradiation in the specific case of the 59.54 keV and 26.34 keV gamma lines emitted by Am241. The spectral results of FIG. 6 are the basis for integrating the total counts within two separate energy bands consisting of Band 1 700 between 40 and 65 keV and Band 2 705 between 19.5 and 23.5 keV, as illustrated in FIG. 7. FIG. 7 shows un-normalised backscatter spectral plots as a function of energy overlaid with two separate energy bands within which the number of Compton backscatter events are recorded. The ratio of the two count rates for various materials is then compared in the bar chart of FIG. 8. It is to be noted that the two explosive simulant materials represented by the two righthand pillars 800 in FIG. 8 are almost identical in height and clearly distinguishable from the benign materials whose Band 2/Band 1 ratios are smaller. This is a remarkable result given that the relative backscatter signals have been found to vary substantially between different materials of identical thickness.

It has also been found that the explosive simulant materials produce a much stronger signal by a factor of between 1.6 and 2 when compared to a lithium ion battery of the same thickness. So if the battery of a device was replaced by a smaller battery to preserve the device's apparent functionality, and the resulting void was then filled with an explosive, this explosive charge would yield a greatly enhanced gamma backscatter signal. This would occur provided the gamma transmission losses through the outer shell of the device were relative small, which would be the case for gamma photons with energies above approximately 40 keV.

Embodiments of the invention improve the explosives' Compton backscattered gamma spectral signature relative to the signature due to the benign materials of an electronic device 300 that lies above the tiles 105. The issue being addressed is that the explosive charge may be localized within the electronic device, for example in the battery compartment.

In a further development of the arrangement, a neutron source can alternatively be used. For example, a fast neutron source can be formed by the interaction of alpha particles emitted for example by Am241 with Beryllium. A very small percentage (~30 out of every 1 million) of the alpha particles emitted by Am241 are captured by Be9 to form Carbon-12 accompanied by the prompt emission of a fast neutron of average energy 4.2 MeV (max energy 11 MeV) and a prompt gamma of energy 4.44 MeV. Therefore an intense Am241 source would be required to provide a meaningful flux of fast neutrons, and the gamma emission from such a source if unshielded would be a safety hazard. Fortunately the 60 keV gamma emission from the Am241 could be made safe by enclosing the Am/Be source inside a lead capsule with 2 mm thick walls. A meaningful flux of neutrons would be very roughly about ~3000+ n/s (the value is driven by n/root n noise statistics). Fast neutrons exhibit a low capture cross-section with other nuclei, and instead interact with nuclei through inelastic scattering interactions. These collision processes excite the target nucleus which then decays through the emission of characteristic gamma radiation as the nucleus decays to the nuclear ground state. Carbon-12 emits 4438 keV and other gamma; Nitrogen-14 emits 5106 keV and other gamma; and Oxygen-16 emits 6130 keV and other gamma. By measuring the relative intensities of these characteristic gamma emission lines, it is possible to deduce the presence of explosive compounds since these compounds have characteristic ratios of nitrogen to carbon, and oxygen to carbon. They can also be used to detect narcotic compounds which have their own distinctive ratios of nitrogen to carbon, and oxygen to carbon which are typically different from that of nitrogen based explosives.

Fast neutrons are far more effective than thermal neutrons (characteristic energy ~0.025 keV at room temperature) for detecting the presence of explosives. Slow thermal neutrons are efficiently captured by atomic nuclei. Carbon, nitrogen and oxygen all emit characteristic capture gamma at a number of discrete energies between 18.4 keV and 4945 keV. The problem with thermal neutrons is the capture probability of a neutron by nitrogen-14 is ~395 times larger than that for oxygen-16 and even more for carbon-12. This means that slow neutrons can only be used to establish an anomalous high concentration of nitrogen in the target device. The technique using slow neutrons is therefore ineffective for detecting the explosive compound TATP which is peroxide based explosive with no nitrogen content.

Embodiments of the invention can be designed to be self-contained and able to operate independently of other sensors. The proposed gamma gauge detection system could complement existing security systems by providing a portable scanner capable of detecting explosives hidden inside an electronic device even where care has been used to remove explosive residues from the outside casing, and the explosive encapsulated, for example within wax, to prevent the escape of explosive indicator molecules.

For ad-hoc security gate applications where deployment would be from a commercial aircraft, the system would need to meet the size and weight requirements for transport on the aircraft. As such the maximum footprint of the system's case would need to be less than approximately 560 mm×450 mm×250 mm which corresponds to a standard storage case. Similarly the system weight including storage case should not exceed 20 kg to potentially allow the system transport case to be stored in an overhead locker when required.

Power consumption by a Compton Backscatter system is intrinsically very small. The power could be provided by a USB port on an associated laptop computer. Consequently the system can be operated away from any mains power source. The typical mains power consumption of a laptop suitable to drive the detector system is approximately 65 Watts (240 Volts AC, 1.7 Amps). A fully charged laptop to provide operating times of up to 4 hours before recharge is required.

The invention claimed is:

1. A radiation backscatter detector assembly comprising:
a source array comprising a plurality of source components for irradiating a shared sample location, at least two of the source components of the source array configured to generate radiation in different respective source energy bands; and a detector array comprising a plurality of detector elements for detecting backscattered radiation detection events from different respective spatial portions of the shared sample location, the detector elements each generating a pulse output in response to each radiation detection event detected by the respective detector element, the pulse output for output to an energy meter for measuring the energies of the pulse outputs by different respective detector elements, wherein at least one of the source components is configured to be shared with at least one contiguous tile in a tiled formation of the detector array.

2. The detector assembly according to claim 1, wherein different respective spatial portions of the shared sample location overlap.

3. The detector assembly according to claim 1, further comprising a collator for sorting pulse outputs according to their measured energy, the outputs being generated by at least two different detector elements.

4. The detector assembly according to claim 1, further comprising a processor configured to provide the energy meter by processing the pulse outputs to give a ratio of the total energies between the detector energy bands for each detector element.

5. The detector assembly according to claim 1, further comprising a counter for counting sorted pulse outputs having a measured energy in each of at least two different detector energy bands.

6. The detector assembly according to claim 1, wherein each tile represents a detector element and is configured to produce a pulse output in response to each radiation detection event detected by the respective detector element.

7. The detector assembly according to claim 6, wherein the tiles each comprise a group of devices generating between them a common output.

8. The detector assembly according to claim 1, wherein the detector elements each comprise scintillation material and a silicon photomultiplier.

9. The detector assembly according to claim 1, wherein the source components comprise at least two different radioisotopes that generate radiation at different respective spectral emission lines, thus generating radiation in the different respective source energy bands.

10. The detector assembly according to claim 9, wherein the sources are selected from the group Americium-241 (Am241), Barium-133 (Ba133), and Europium-152 (Eu152).

11. The detector assembly according to claim 1, wherein the source components are mounted in relation to the detector elements so as to give a predictable irradiation pattern over the shared sample location.

12. The detector assembly according to claim 1, wherein the source components are distributed in a repetitive pattern with respect to the detector elements and mounted such that an available area of the detector elements that is shaded by the components with respect to the backscattered radiation of the detection events is not more than half.

13. The detector assembly according to claim 11, wherein the source components are mounted to be substantially evenly distributed with respect to a detecting surface of the detector assembly and such that a rate at which gamma flux falls with distance r from a source emitting plane is less than $r^2$.

14. The detector assembly according to claim 1, wherein the source components are mounted such that a rate at which gamma flux falls with distance r from a source emitting plane is approximately a factor of two with every 15.5 mm increase in range.

15. The detector assembly according to claim 1, further comprising a neutron source for supplying neutrons to the shared sample location.

16. A radiation detector comprising an array of photomultiplier detectors in a tiled formation, each tile being contiguous with at least one other tile, wherein each tile is provided with at least a first gamma source and a second gamma source, the first gamma source generating radiation in a first energy band and the second gamma source generating radiation in a second energy band different from the first energy band, wherein each tile is configured with a plurality of the photomultiplier detectors of the array, and wherein at least one of the first gamma source and the second gamma source is shared between contiguous tiles.

17. The detector of claim 16, wherein the first gamma source and the second gamma source are included in a plurality of sources provided with each tile, the plurality of sources comprising one or more Barium-133 (Ba133) sources and one or more Americium-241 (Am241) sources.

18. The detector of claim 17, wherein at least one of the plurality of sources is placed along an edge of each tile, and the at least one of the sources placed along the edge are shared between contiguous tiles.

19. A radiation detector comprising an array of photomultiplier detectors in a tiled formation, each tile being contiguous with at least one other tile, wherein each tile is provided with at least a first gamma source and a second gamma source, the first gamma source generating radiation in a first energy band and the second gamma source generating radiation in a second energy band different from the first energy band, wherein each tile is configured with a plurality of the photomultiplier detectors of the array, the photomultiplier detectors generating pulse outputs in response to radiation detection events, and wherein at least one of the first gamma source and the second gamma source is shared between contiguous tiles.

20. The detector of claim 19, wherein the first gamma source and the second gamma source are included in a plurality of sources provided with each tile, the plurality of sources comprising multiple Barium-133 (Ba133) sources and multiple Americium-241 (Am241) sources, wherein at least one of the Ba133 sources are placed along an edge of each tile, wherein at least one of the Am241 sources are placed along the edge of each tile, and wherein each of the Ba133 and Am241 sources placed along the edge are shared between contiguous tiles.

* * * * *